United States Patent
Leng (10) Patent No.: US 9,588,610 B2
(45) Date of Patent: Mar. 7, 2017

(54) DISPLAY DEVICE, DISPLAY SYSTEM AND CONTROL METHOD THEREOF FOR ACHIEVING SYNCHRONIZED INTERACTION WITH TERMINAL DEVICE

(71) Applicant: BOE TECHNOLOGY GROUP CO., LTD., Beijing (CN)

(72) Inventor: Changlin Leng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 327 days.

(21) Appl. No.: 14/366,735

(22) PCT Filed: Apr. 2, 2013

(86) PCT No.: PCT/CN2013/073653
§ 371 (c)(1),
(2) Date: Jun. 19, 2014

(87) PCT Pub. No.: WO2014/127561
PCT Pub. Date: Aug. 28, 2014

(65) Prior Publication Data
US 2015/0185934 A1   Jul. 2, 2015

(30) Foreign Application Priority Data
Feb. 22, 2013 (CN) .......................... 2013 1 0056626

(51) Int. Cl.
*G06F 3/041* (2006.01)
*G06F 3/0488* (2013.01)

(52) U.S. Cl.
CPC .......... *G06F 3/0412* (2013.01); *G06F 3/0488* (2013.01); *G06F 2203/04806* (2013.01)

(58) Field of Classification Search
CPC ........... G06F 2203/041; G06F 3/03547; G06F 3/041; G06F 3/0412; G06F 3/0414;
(Continued)

(56) References Cited

U.S. PATENT DOCUMENTS

2008/0150919 A1  6/2008  Kanamaru
2008/0225008 A1  9/2008  Madonna et al.

FOREIGN PATENT DOCUMENTS

CN    101067774 B    11/2007
CN    201294037 A    8/2008
(Continued)

OTHER PUBLICATIONS

Third Chinese Office Action dated Jun. 15, 2015; Appln. No. 201310056626.X.
(Continued)

*Primary Examiner* — Rodney Amadiz
(74) *Attorney, Agent, or Firm* — Ladas & Parry LLP (57) ABSTRACT

The present disclosure discloses a display device, a display system and a control method. The display device includes a receiving module for receiving an image frame; a first decoder for decoding the image frame; the display module for performing an outputting and displaying process on decoded image data; a touch module for responding to an image display command corresponding to a touch point of a user on a touch screen; a touch point coordinate extracting module for reading a first coordinate data of the touch point of the user on the touch screen; a microcontroller for converting the first coordinate data into a second coordinate data according to a correspondence between a resolution of the display device and a resolution of the terminal device; an encoder for generating a control frame including the second coordinate data; and a transmitting module for transmitting the control frame to the terminal device.

15 Claims, 3 Drawing Sheets

(58) Field of Classification Search
CPC ...... G06F 3/0416; G06F 3/0418; G06F 3/046; G06F 3/047; G06F 2203/04107; G06F 2203/04111; H05K 9/0073; H05K 9/0079; H05K 9/0081; H05K 9/0088
USPC ............. 345/173–174; 178/18.01–18.11
See application file for complete search history.

(56) References Cited

FOREIGN PATENT DOCUMENTS

| CN | 101330300 A | 12/2008 |
|---|---|---|
| CN | 101667079 A | 3/2010 |
| CN | 101689099 A | 3/2010 |
| CN | 101963857 A | 2/2011 |
| CN | 202439644 U | 9/2012 |
| CN | 102750067 A | 10/2012 |
| CN | 202486740 U | 10/2012 |
| CN | 102826047 A | 12/2012 |
| CN | 102855866 B | 1/2013 |

OTHER PUBLICATIONS

International Preliminary Report on Patentability issued Aug. 25, 2015; PCT/CN2013/073653.
First Chinese Office Action issued Sep. 3, 2013, Appln. No. 201310056626.X.
Chinese Notice of Patent Grant issued Nov. 19, 2015; Appln. No. 201410056626.X.
The State Intellectual Property Office of the People's Republic of China ("SIPO") (Chinese language) second office action issued on Jan. 15, 2015 by SIPO in Chinese Patent Application 201310056626.X. Eight (8) pages.
English Translation of the State Intellectual Property Office of the People's Republic of China ("SIPO") (Chinese language) second office action issued on Jan. 15, 2015 by SIPO in Chinese Patent Application 201310056626.X. Eight (8) pages.
English translation of CN101067774; One (1) pages.
English translation of CN102855866; One (1) pages.
English abstract of CN101667079A, listed above, 2 pages.
English abstract of CN101963857A, listed above, 2 pages.
English abstract of CN102826047A, listed above, 1 page.
English abstract of CN102750067A, listed above, 1 page.
International Search Report (Chinese language) issued by the State Intellectual Property Office ("SIPO") on Nov. 20, 2013 for international application PCT/CN2013/073653, 12 pages.

DISPLAY DEVICE, DISPLAY SYSTEM AND CONTROL METHOD THEREOF FOR ACHIEVING SYNCHRONIZED INTERACTION WITH TERMINAL DEVICE

CROSS REFERENCE TO RELATED APPLICATIONS

This application is based on International Application No. PCT/ CN2013/ 073653 filed on Apr. 2, 2013, which claims priority to Chinese National Application No. 201310056626.X filed on Feb. 22, 2013. The entire contents of each and every foregoing application are incorporated herein by reference.

TECHNICAL FIELD OF THE DISCLOSURE

The present disclosure relates to a field of liquid crystal display technology, and particularly to a display device, a display system and a control method.

BACKGROUND

Figure 1:
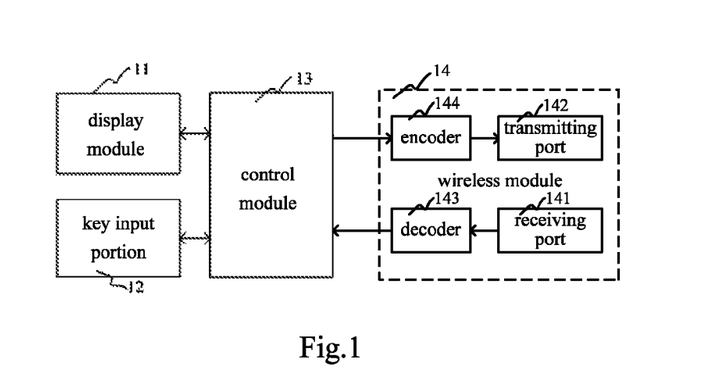
FIG. 1 is a schematic diagram of a structure of a wireless display device in prior art.

Structure of a wireless display device in prior art is shown in FIG. 1, and the device includes a display module 11, a key input portion 12, a control module 13 and a wireless module 14, wherein the wireless module includes a receiving port 141, a transmitting port 142, a decoder 143 and an encoder 144. In the wireless display device shown in FIG. 1, the receiving port 141 receives an image frame from a terminal device, the decoder 143 decodes the image frame to obtain decoded image data which is transmitted to the display module 11 by the control module 13, and the display module 11 performs an outputting and displaying process on the decoded image data; the key input portion 12 receives an image control command issued from a user, which is forwarded to the encoder 143 by the control module 13, the encoder 143 encodes the command, generates a control frame comprising the image control command, and transmits the same to the terminal device through the transmitting port 142, thus achieving a simultaneous interaction between the terminal device and the display device, enhancing display quality of a high resolution color image, solving a problem of user's potential unsatisfactory to a display image due to the terminal device being a small size, and improving user experience. Wherein the terminal device transmits the image frame including the image data to the display device, the display device transmits the control frame for controlling generation of the image frame to the terminal device, and the control frame includes the control command for repeating, stopping, zooming in or out a certain particular area on a screen of the display device.

However, under such interactive mode, in order to guarantee an image transmitting speed and an effective rate, the transmitting speed is required to be higher than 500 Mbps since both the image frame and the control frame include a huge amount of data, otherwise transmission of the huge amount of data may cause a jam and a delay of a link, which will affect the simultaneous interaction between the terminal device and the display device, thereby it is difficult to achieve a real simultaneous display.

SUMMARY

In embodiments of the present disclosure, there is provided a display device, a display system and a control method for achieving the simultaneous interaction between the terminal device and the liquid crystal display device, and meanwhile guaranteeing the consistency of a touch point between the display device and the terminal device.

In the embodiments of the present disclosure, there is provided a display device including:

a receiving module for receiving an image frame from a terminal device;

a first decoder for decoding the image frame to obtain decoded image data and transmitting the decoded image data to a display module;

the display module for performing an outputting and displaying process on the decoded image data;

a touch module for generating a first coordinate data to achieve a touch and display function, in response to an image display command corresponding to a touch point of a user on a touch screen;

a touch point coordinate extracting module for reading the first coordinate data of the touch point of the user on the touch screen;

a microcontroller for converting the first coordinate data into a second coordinate data according to a correspondence between a resolution of the display device and a resolution of the terminal device;

an encoder for generating a control frame including the second coordinate data; and a transmitting module for transmitting the control frame to the terminal device.

The receiving module receives the image frame from the terminal device in a wireless manner, and the transmitting module transmits the control frame to the terminal device in a wireless manner.

Moreover, the display device further includes:

a connecting port for receiving the image frame from the terminal device in a wired manner;

a selector for transmitting the decoded image data from the first decoder to the display module or transmitting the image frame received from the connecting port to a serial port hub according to the control of the microcontroller;

the serial port hub for forwarding the image frame received from the connecting port to a second decoder and forwarding touch control data to the touch module; and the second decoder for decoding the image frame received from the connecting port to obtain decoded image data and transmitting the decoded image data to the display module.

Wherein the display module includes:

a timing control unit for controlling an outputting and displaying sequence of the image data; and a display screen for displaying the image data.

The touch module includes:

a touch screen for generating a corresponding touch coordinate signal according to a touch operation of the user; and a touch controller chip for analyzing the touch coordinate signal and generating the first coordinate data.

In the embodiments of the present disclosure, there is provided a display system including the display device.

In the embodiments of the present disclosure, there is provided a method for controlling data exchange inside the display device, and the method includes:

receiving an image frame from a terminal device by the receiving module;

extracting image data from the image frame and decoding the extracted image data to obtain decoded image data by the decoder;

performing an outputting and displaying process on the decoded image data by the display module;

generating a first coordinate data to achieve a touch and display function by the touch module, in response to an image display command corresponding to a touch point of a user on a touch screen;

reading the first coordinate data of the touch point of the user on the touch screen by the touch point coordinate extracting module;

converting the first coordinate data into a second coordinate data according to a correspondence between a resolution of the display device and a resolution of the terminal device by the microcontroller;

generating a control frame including the second coordinate data by the encoder; and transmitting the control frame to the terminal device by the transmitting module.

Furthermore, the receiving module receives the image frame from the terminal device in a wireless manner, and the transmitting module transmits the control frame to the terminal device in a wireless manner.

When the display device further includes: a connecting port, a selector, a serial port hub, and a second decoder, the method further includes:

receiving the image frame from the terminal device in a wired manner by the connecting port;

transmitting the decoded image data from the first decoder to the display module or transmitting the image frame received from the connecting port to the serial port hub according to the control of the microcontroller by the selector;

forwarding the image frame received from the connecting port to the second decoder and forwarding touch control data to the touch module by the serial port hub; and decoding the image frame received from the connecting port by the second decoder to obtain decoded image data and transmitting the decoded image data to the display module.

Wherein the control frame includes:

a communication protocol identifier for identifying a communication protocol;

a terminal device identifier ID; and a data segment storing the second coordinate data.

In addition, the first coordinate data and the second coordinate data satisfy the following equation:

$$f_2(x_2, y_2) = \frac{TN2}{TN1} \times \frac{F1}{F2} \times N \times f_1(x_1, y_1)$$

Wherein $f_1(x_1, y_1)$ represents the first coordinate data; $f_2(x_2, y_2)$ represents the second coordinate data; TN1 represents a total number of touch points in the display device; TN2 represents a total number of touch points in the terminal device; F1 represents a resolution of a screen of the display device; F2 represents a resolution of a screen of the terminal device; N represents a resolution zooming conversion coefficient.

The display device provided in the embodiments of the present disclosure includes a receiving module for receiving an image frame from a terminal device; a first decoder for decoding the image frame to obtain decoded image data and transmitting the decoded image data to a display module; the display module for performing an outputting and displaying process on the decoded image data; a touch module for generating a first coordinate data to achieve a touch and display function, in response to an image display command corresponding to a touch point of a user on a touch screen; a touch point coordinate extracting module for reading the first coordinate data of the touch point of the user on the touch screen; a microcontroller for converting the first coordinate data into a second coordinate data according to a correspondence between a resolution of the display device and a resolution of the terminal device; an encoder for generating a control frame including the second coordinate data; and a transmitting module for transmitting the control frame to the terminal device. In the display device, an image mirror or extension function between the terminal device and the display device can be achieved through the wireless transmission, meanwhile the touch point coordinate extracting module in the display device can obtain the first coordinate data of the touch point on the display, the microcontroller performs a touch coordinate conversion on the first coordinate data to obtain the second coordinate data based on the difference between the liquid crystal display device and the terminal device, and then the second coordinate data is transmitted to the terminal device in a form of the control frame through wireless transmission. Moreover, since the second coordinate data included in the data segment in the control frame includes a small amount of data, there is no much requirements on the transmission speed, and the transmission of the small amount of data may generally not cause a jam and a delay of a link, which is helpful for achieving the simultaneous interaction between the terminal device and the display device, and meanwhile guaranteeing the consistency of the touch point between the display device and the terminal device.

BRIEF DESCRIPTION OF THE DRAWINGS

In order to more clearly describe the technical solutions of the embodiments of the present disclosure or the prior art, drawings necessary for describing the embodiments of the present disclosure or the prior art are simply introduced as follows. It should be obvious for those skilled in the art that the drawings described as follows are only some embodiments of the present disclosure and other drawings can be obtained according to these drawings without paying inventive efforts.

REFERENCE SIGNS

11—display module; 12—key input portion; 13—control module; 14—wireless module; 141—receiving port; 142—transmitting port; 143—decoder; 144—encoder; 21—receiving module; 22—first decoder; 23—display module; 24—touch module; 25—touch point coordinate extracting module; 26—microcontroller; 27—encoder; 28—transmitting module; 29—connecting port; 210—selector; 211—serial port hub; 212—second decoder; 231—timing controller; 232—display panel; 241—touch screen; 242—touch controller chip; M1—communication protocol identifier; M2—terminal device ID; M3—data segment.

DETAILED DESCRIPTION

According to one aspect of the present disclosure, there is provided a display device and a control method for achieving the simultaneous interaction between a terminal device and the display device, and meanwhile guaranteeing the consistency of a touch point between the display device and the terminal device.

Embodiments of the present disclosure will be described clearly and thoroughly below in connection with accompanying drawings. It should be obvious for those skilled in the art that the embodiments described below are only a part of embodiments of the present disclosure rather than all of the embodiments of the present disclosures. On the basis of the embodiments of the present application, all other embodiments obtained by those skilled in the art without paying inventive efforts should be considered as belonging to the scope claimed by the present disclosure.

Figure 2:
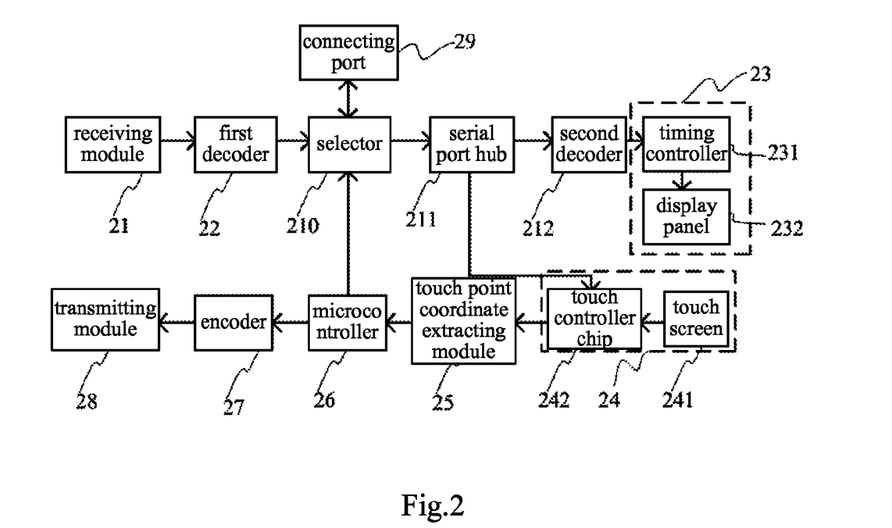
FIG. 2 is a schematic diagram of a structure of a wireless display device provided in the embodiments of the present disclosure.

In the embodiments of the present disclosure, there is provided a display device, and internal structure of the display device is as shown in FIG. 2. It can be seen from FIG. 2 that the display device includes a receiving module 21, a first decoder 22, a display module 23, a touch module 24, a touch point coordinate extracting module 25, a microcontroller 26, an encoder 27, a transmitting module 28, a connecting port 29, a selector 210, a serial port hub 211, and a second decoder 212. The display device of the embodiments of the present disclosure may be any product or means possessing a display function, such as, a liquid crystal panel, an electronic paper, an OLED panel, a mobile phone, a tablet computer, a television, a display, a notebook computer, a digital picture frame, a navigator and so on.

Particularly, the receiving module 21 is used for receiving an image frame from a terminal device and forwarding the image frame to the first decoder 22;

the first decoder 22 is used for extracting image data from the image frame received, decoding the extracted image data to obtain decoded image data;

the display module 23 is used for performing an outputting and displaying process on the decoded image data; meanwhile it can be seen from FIG. 2 that the display module 23 includes a timing controller 231 and a display panel 232, wherein the timing controller 231 is used for controlling an outputting and displaying sequence of the image data in a chronological order; and the display panel 232 is used for displaying the ordered image data by the timing controller 231;

the touch module 24 is used for generating a first coordinate data $f_1(x_1,y_1)$ to achieve a touch and display function for the terminal device, in response to an image display command corresponding to a touch point of a user on a touch screen;

it can be seen from FIG. 2 that the touch module 24 includes a touch panel 241 and a touch controller chip 242, wherein the touch screen 241 is used for generating a corresponding touch coordinate signal according to a touch operation of the user; and the touch controller chip 242 is used for analyzing the touch coordinate signal and generating the first coordinate data $f_1(x_1,y_1)$;

the touch point coordinate extracting module 25 is used for reading the first) coordinate data $f_1(x_1,y_1)$ of the touch point of the user on the touch screen 241 and forwarding the first coordinate data $f_1(x_1,y_1)$ to the microcontroller 26;

the microcontroller 26 is used for receiving the first coordinate data $f_1(x_1,y_1)$ forwarded by the touch point coordinate extracting module 25, converting the first coordinate data $f_1(x_1,y_1)$ into a second coordinate data $f_2(x_2,y_2)$ according to a correspondence between a resolution of the display device and a resolution of the terminal device, and transmitting the second coordinate data $f_2(x_2,y_2)$ to the encoder 27;

the first coordinate data $f_1(x_1,y_1)$ and the second coordinate data $f_2(x_2,y_2)$ satisfy the following equation:

$$f_2(x_2, y_2) = \frac{TN2}{TN1} \times \frac{F1}{F2} \times N \times f_1(x_1, y_1)$$

Wherein $f_1(x_1,y_1)$ represents the first coordinate data; $f_2(x_2,y_2)$ represents the second coordinate data; TN1 represents a total number of touch points in the display device; TN2 represents a total number of touch points in the terminal device; F1 represents a resolution of a screen of the display device; F2 represents a resolution of a screen of the terminal device; N represents a resolution zooming conversion coefficient.

The above equation should be satisfied by the coordinate in the terminal device and the coordinate in the display device with assumption that the terminal device is oriented horizontally. However, when the screen of the terminal device is rotated, software in the terminal device may rotate the picture displayed on the screen under the control of an accelerometer inside the terminal device. At this time, the coordinate of the touch point on the terminal device changes and satisfies the following equation:

$$f_2'(x_2', y_2') = \frac{TN2}{TN3} \times \frac{F4}{F3} \times N' \times r \times f_2(x_2, y_2)$$

Wherein $f_2'(x_2',y_2')$ represents the coordinate of the touch point when the screen of the terminal device is oriented horizontally, TN3 represents a total number of touch points along a vertical direction of the terminal device, F3 represents an effective display resolution when the terminal device is oriented vertically, F4 represents an effective display resolution when the terminal device is oriented horizontally; N' represents an effective display resolution zooming conversion coefficient when the terminal device is rotated, the conversion coefficient varies when the Aspect Ratio of the screen and the resolution vary, r represents a screen rotation coefficient and shows position and angle variation of the image after the screen is rotated by 90°.

Figure 3:
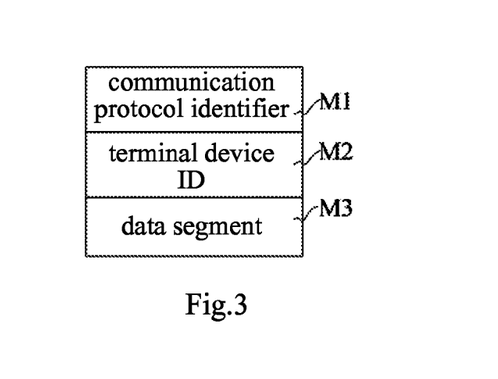
FIG. 3 is a schematic diagram of an internal structure of a control frame provided in the embodiments of the present disclosure.

The encoder 27 is used for receiving the second coordinate data $f_2(x_2,y_2)$ transmitted by the microcontroller 26, generating a control frame, and transmitting the control frame to the transmitting module 28; wherein the control frame includes a communication protocol identifier M1, a terminal device identifier ID M2 and a data segment M3, and has an internal structure as shown in FIG. 3; in the control frame, the communication protocol identifier M1 is used for identifying a communication protocol, the terminal device identifier ID M2 includes a particular ID of the terminal device, the data segment M3 includes the second coordinate data $f_2(x_2,y_2)$ in consistent with the resolution of the screen of the terminal device.

The transmitting module 28 is used for transmitting the control frame including the second coordinate data $f_2(x_2,y_2)$ to the terminal device.

It should be noted that the receiving module 21 receives the image frame from the terminal device in a wireless manner, and likewise the transmitting module 28 transmits the control frame to the terminal device in a wireless manner. When the display device is connected to the terminal device in a wired manner, the second coordinate data generated by the microcontroller is transmitted to the terminal device via the connecting port 29 by the selector 210.

In the embodiments of the present disclosure, there is provided a display system including the display device. The display system includes the above described display device and the terminal device, the terminal device may be any product or means possessing a display function, such as, an electronic paper, a mobile phone, a tablet computer, a television, a display, a notebook computer, a digital picture frame, a navigator and so on.

In the embodiments of the present disclosure, there is provided a method for controlling data exchange inside the display device, and the method particularly includes:

receiving an image frame from a terminal device by the receiving module;

extracting image data from the image frame and decoding the extracted image data to obtain decoded image data by the decoder;

performing an outputting and displaying process on the decoded image data by the display module;

generating a first coordinate data to achieve a touch and display function by the touch module, in response to an image display command corresponding to a touch point of a user on a touch screen;

reading the first coordinate data of the touch point of the user on the touch screen by the touch point coordinate extracting module;

converting the first coordinate data into a second coordinate data according to a correspondence between a resolution of the display device and a resolution of the terminal device by the microcontroller;

generating a control frame including the second coordinate data by the encoder; and transmitting the control frame to the terminal device by the transmitting module.

It should be noted that the receiving module receives the image frame from the terminal device in a wireless manner, and the transmitting module transmits the control frame to the terminal device in a wireless manner.

When the display device further includes: a connecting port, a selector, a serial port hub, and a second decoder, the method further includes:

receiving the image frame from the terminal device in a wired manner by the connecting port;

transmitting the decoded image data from the first decoder to the display module or transmitting the image frame received from the connecting port to the serial port hub according an enable signal received from the microcontroller by the selector;

forwarding the image frame received from the connecting port to the second decoder and forwarding the touch control data to the touch module by the serial port hub; and decoding the image frame received from the connecting port by the second decoder to obtain decoded image data for being transmitted to the display module.

Wherein the control frame includes:

a communication protocol identifier for identifying a communication protocol;

a terminal device identifier ID; and a data segment storing the second coordinate data.

In addition, the first coordinate data and the second coordinate data satisfy the following equation:

$$f_2(x_2, y_2) = \frac{TN2}{TN1} \times \frac{F1}{F2} \times N \times f_1(x_1, y_1)$$

Wherein $f_1(x_1,y_1)$ represents the first coordinate data; $f_2(x_2,y_2)$ represents the second coordinate data; TN1 represents a total number of touch points in the display device; TN2 represents a total number of touch points in the terminal device; F1 represents a resolution of a screen of the display device; F2 represents a resolution of a screen of the terminal device; N represents a resolution zooming conversion coefficient.

Figure 4:
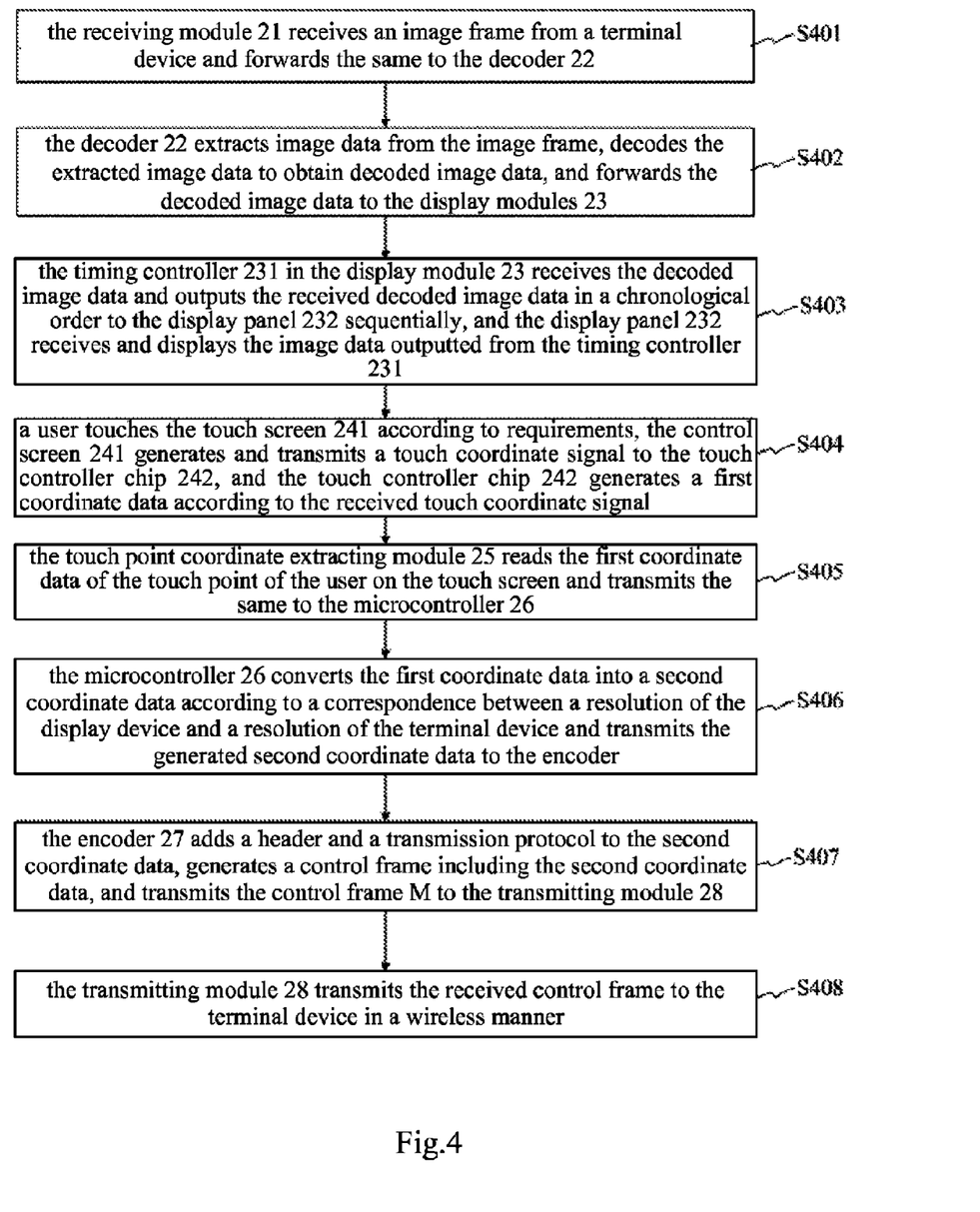
FIG. 4 is a flowchart of a data exchange process inside the display device provided in the embodiments of the present disclosure.

When the display device and the terminal device are connected in a wireless manner, a flowchart of a method for controlling data exchange inside the display device is shown in FIG. 4 and particularly includes the following steps.

At step S401, the receiving module 21 receives an image frame from a terminal device and forwards the same to the decoder 22.

At step S402, the decoder 22 extracts image data from the image frame and decodes the extracted image data to obtain decoded image data, and forward it to the display module 23.

At step S403, the timing controller 231 in the display module 23 receives the decoded image data and outputs the received decoded image data in a chronological order to the display panel 232 sequentially, and the display panel 232 receives and displays the image data outputted from the timing controller 231.

At step S404, a user touches the touch screen 241 according to requirements, the control screen 241 generates and transmits a touch coordinate signal to the touch controller chip 242, and the touch controller chip 242 generates a corresponding first coordinate data $f_1(x_1,y_1)$ according to the received touch coordinate signal.

At step S405, the touch point coordinate extracting module 25 reads the first coordinate data $f_1(x_1,y_1)$ of the touch point of the user on the touch screen and transmits the same to the microcontroller 26.

At step S406, the microcontroller 26 converts the first coordinate data $f_1(x_1,y_1)$ into a second coordinate data $f_2(x_2,y_2)$ according to a correspondence between a resolution of the display device and a resolution of the terminal device and transmits the generated second coordinate data $f_2(x_2,y_2)$ to the encoder; wherein the first coordinate data and the second coordinate data satisfy the following equation:

$$f_2(x_2, y_2) = \frac{TN2}{TN1} \times \frac{F1}{F2} \times N \times f_1(x_1, y_1)$$

Wherein $f_1(x_1,y_1)$ represents the first coordinate data; $f_2(x_2,y_2)$ represents the second coordinate data; TN1 represents a total number of touch points in the display device; TN2 represents a total number of touch points in the terminal device; F1 represents a resolution of a screen of the display device; F2 represents a resolution of a screen of the terminal device; N represents a resolution zooming conversion coefficient.

It should be noted that the above equation should be satisfied by the coordinate in the terminal device and the coordinate in the display device with assumption that the terminal device is oriented horizontally. However, when the screen of the terminal device is rotated, software in the terminal device may rotate the picture displayed on the screen under the control of an accelerometer inside the terminal device. Therefore, the terminal device will further convert the received second coordinate data $f_2(x_2,y_2)$ into a third coordinate data $f_2'(x_2',y_2')$, and generate an image frame according to the third coordinate data $f_2'(x_2',y_2')$, and the variation of the coordinate of the touch point on the terminal device should satisfy the following equation:

$$f_2'(x_2', y_2') = \frac{TN2}{TN3} \times \frac{F4}{F3} \times N' \times r \times f_2(x_2, y_2)$$

Wherein $f_2'(x_2',y_2')$ represents the coordinate of the touch point when the screen of the terminal device is oriented horizontally, TN3 represents a total number of touch points along a vertical direction of the terminal device, F3 represents an effective display resolution when the terminal device is oriented vertically, F4 represents an effective display resolution when the terminal device is oriented horizontally; N' represents an effective display resolution zooming conversion coefficient when the terminal device is rotated, the conversion coefficient varies when the Aspect Ratio and the resolution of the screen vary, r represents a screen rotation coefficient and shows position and angle variation of the image after the screen is rotated by 90°.

At step S407, the encoder 27 adds a header and a transmission protocol to the second coordinate data $f_2(x_2, y_2)$, generates a control frame including the second coordinate data $f_2(x_2,y_2)$, and transmits the control frame to the transmitting module 28.

At step S408, the transmitting module 28 transmits the control frame to the terminal device in a wireless manner.

It should be noted that the receiving module 21 receives the image frame from the terminal device in a wireless manner, and the transmitting module 28 transmits the control frame to the terminal device in a wireless manner.

When the display device further includes a connecting port 29, a selector 210, a serial port hub 211, and a second decoder 212, the method further includes the following steps.

The connecting port 29 receives the image frame from the terminal device in a wired manner.

The selector 210 transmits the decoded image data from the first decoder 22 to the display module 23 or transmits the image frame received from the connecting port 29 to the serial port hub 211 according to an enable signal received from the microcontroller.

The serial port hub 211 forwards the image frame received from the connecting port 29 to the second decoder 212 and forwards touch control data to the touch module 24.

The second decoder 212 decodes the image frame received from the connecting port 29 to obtain decoded image data and transmitting the decoded image data to the display module 23.

Figure 5:
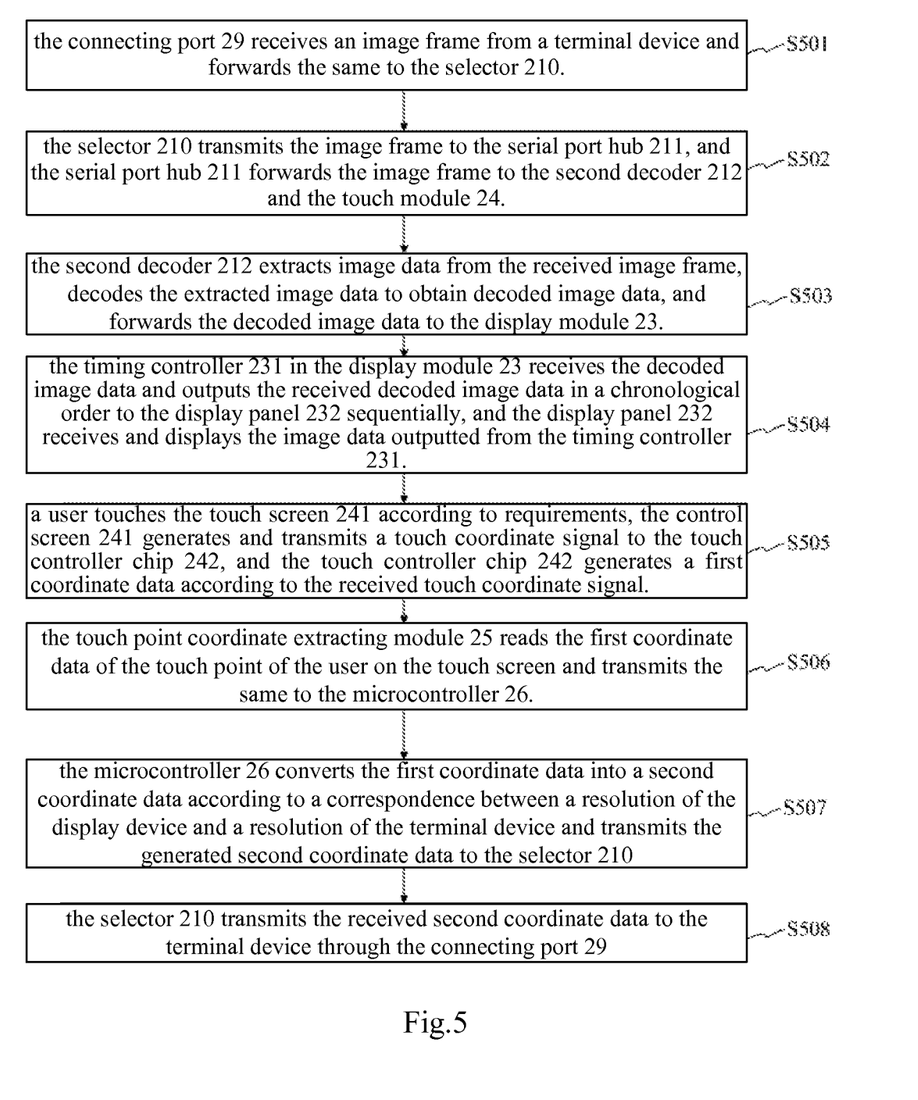
FIG. 5 is another flowchart of a data exchange process inside the display device provided in the embodiments of the present disclosure.

When the display device and the terminal device are connected in a wired manner, a flowchart of a method for controlling data exchange inside the display device is shown in FIG. 5 and particularly includes the following steps.

At step S501, the connecting port 29 receives an image frame from a terminal device and forwards the same to the selector 210.

At step S502, the selector 210 transmits the image frame to the serial port hub 211 according to an enable signal received from the microcontroller 26, and the serial port hub 211 forwards the image frame to the touch module 24 and the second decoder 212.

At step S503, the second decoder 212 extracts image data from the received image frame, decodes the extracted image data to obtain decoded image data, and forwards the decoded image data to the display module 23.

At step S504, the timing controller 231 in the display module 23 receives the decoded image data and outputs the received decoded image data in a chronological order to the display panel 232 sequentially, and the display panel 232 receives and displays the image data outputted from the timing controller 231.

At step S505, a user touches the touch screen 241 according to requirements, the control screen 241 generates and transmits a touch coordinate signal to the touch controller chip 242, and the touch controller chip 242 generates a corresponding first coordinate data $f_1(x_1,y_1)$ according to the received touch coordinate signal.

At step S506, the touch point coordinate extracting module 25 reads the first coordinate data $f_1(x_1,y_1)$ of the touch point of the user on the touch screen and transmits the same to the microcontroller 26.

At step S507, the microcontroller 26 converts the first coordinate data $f_1(x_1,y_1)$ into a second coordinate data $f_2(x_2,y_2)$ according to a correspondence between a resolution of the display device and a resolution of the terminal device and transmits the generated second coordinate data $f_2(x_2,y_2)$ to the selector 210; wherein the first coordinate data $f_1(x_1,y_1)$ and the second coordinate data $f_2(x_2,y_2)$ satisfy the following equation:

$$f_2(x_2, y_2) = \frac{TN2}{TN1} \times \frac{F1}{F2} \times N \times f_1(x_1, y_1)$$

Wherein $f_1(x_1,y_1)$ represents the first coordinate data; $f_2(x_2,y_2)$ represents the second coordinate data; TN1 represents a total number of touch points in the display device; TN2 represents a total number of touch points in the terminal device; F1 represents a resolution of a screen of the display device; F2 represents a resolution of a screen of the terminal device; N represents a resolution zooming conversion coefficient.

It should be noted that the above equation should be satisfied by the coordinate in the terminal device and the coordinate in the display device with assumption that the terminal device is oriented horizontally. However, when the screen of the terminal device is rotated, software in the terminal device may rotate the picture displayed on the screen under the control of an accelerometer inside the terminal device. Therefore, the terminal device will further convert the received second coordinate data $f_2(x_2,y_2)$ to a third coordinate data $f_2'(x_2',y_2')$, and generate an image frame according to the third coordinate data $f_2'(x_2',y_2')$, and the second coordinate data $f_2(x_2,y_2)$ and the third coordinate data $f_2'(x_2',y_2')$ should satisfy the following equation:

$$f_2'(x_2', y_2') = \frac{TN2}{TN3} \times \frac{F4}{F3} \times N' \times r \times f_2(x_2, y_2)$$

Wherein $f_2'(x_2',y_2')$ represents the coordinate of the touch point when the screen of the terminal device is oriented horizontally, TN3 represents a total number of touch points along a vertical direction of the terminal device, F3 represents an effective display resolution when the terminal device is oriented vertically, F4 represents an effective display resolution when the terminal device is oriented horizontally; N' represents an effective display resolution zooming conversion coefficient when the terminal device is rotated, the conversion coefficient varies when the Aspect Ratio of the screen and the resolution vary, r represents a screen rotation coefficient and shows position and angle variation of the image after the screen is rotated by 90°.

At step S508, the selector 210 transmits the received second coordinate data $f_2(x_2,y_2)$ to the terminal device through the connecting port 29.

To sum up, the display device provided in the embodiments of the present disclosure includes a receiving module for receiving an image frame from a terminal device; a first decoder for decoding the image frame to obtain decoded image data and transmitting the decoded image data to a display module; the display module for performing an outputting and displaying process on the decoded image data; a touch module for generating a first coordinate data to achieve a touch and display function, in response to an image display command corresponding to a touch point of a user on a touch screen; a touch point coordinate extracting module for reading the first coordinate data of the touch point of the user on the touch screen; a microcontroller for converting the first coordinate data into a second coordinate data according to a correspondence between a resolution of the display device and a resolution of the terminal device; an encoder for generating a control frame including the second coordinate data; and a transmitting module for transmitting the control frame to the terminal device. Moreover, since the data segment in the control frame only includes the second coordinate data, the control frame only has a small amount of data, the transmission of the small amount of data may generally not cause a jam and a delay of a link and there is no much requirements on the transmission speed, which is helpful for achieving the simultaneous interaction between the terminal device and the display device, and achieving a real simultaneous display.

It will be obvious that those skilled in the art may make modifications, variations and equivalences to the above embodiments without departing the spirit and scope of the present disclosure. Such variations and modifications are intended to be included within the spirit and scope of the present disclosure.

What is claimed is:

1. A display device for achieving synchronized interaction with a terminal device, including:
  a receiving module configured to receive an image frame from a terminal device;
  a first decoder configured to decode the image frame to obtain decoded image data and transmit the decoded image data to a display module;
  the display module configured to perform an outputting and displaying process on the decoded image data;
  a touch module configured to generate a first coordinate data to achieve a touch and display function, in response to an image display command corresponding to a touch point of a user on a touch screen;
  a touch point coordinate extracting module configured to read the first coordinate data of the touch point of the user on the touch screen;
  a microcontroller configured to convert the first coordinate data into a second coordinate data according to a correspondence between a resolution of the display device and a resolution of the terminal device;
  an encoder configured to generate a control frame including the second coordinate data; and
  a transmitting module configured to transmit the control frame to the terminal device;
  wherein the control frame includes a communication protocol identifier for identifying a communication protocol, a terminal device identifier ID and a data segment storing the second coordinate data.

2. The display device of claim 1, wherein the receiving module receives the image frame from the terminal device in a wireless manner, and the transmitting module transmits the control frame to the terminal device in a wireless manner.

3. The display device of claim 2, further including:
  a connecting port configured to receive the image frame from the terminal device in a wired manner;
  a selector configured to transmit the decoded image data from the first decoder to the display module, or to transmit the image frame received from the connecting port to a serial port hub according to the control of the microcontroller;
  the serial port hub configured to forward the image frame received from the connecting port to a second decoder and forward touch control data to the touch module; and
  the second decoder configured to decode the image frame received from the connecting port to obtain decoded image data and transmit the decoded image data to the display module.

4. The display device of claim 1, wherein the display module includes:
  a timing controller configured to control an outputting and displaying sequence of the image data; and
  a display panel configured to display the image data.

5. The display device of claim 1, wherein the touch module includes:
  a touch screen configured to generate a touch coordinate signal according to a touch operation of the user; and
  a touch controller chip configured to analyze the touch coordinate signal and generate the first coordinate data.

6. A display system of claim 1.

7. The display system of claim 6, wherein the receiving module receives the image frame from the terminal device in a wireless manner, and the transmitting module transmits the control frame to the terminal device in a wireless manner.

8. The display system of claim 7, further including:
  a connecting port configured to receive the image frame from the terminal device in a wired manner;
  a selector configured to transmit the decoded image data from the first decoder to the display module, or to transmit the image frame received from the connecting port to a serial port hub according to the control of the microcontroller;
  the serial port hub configured to forward the image frame received from the connecting port to a second decoder and forward touch control data to the touch module; and
  the second decoder configured to decode the image frame received from the connecting port to obtain decoded image data and transmit the decoded image data to the display module.

9. The display system of claim 6, wherein the display module includes:
  a timing controller configured to control an outputting and displaying sequence of the image data; and
  a display panel configured to display the image data.

10. The display system of claim 6, wherein the touch module includes:
 a touch screen configured to generate a touch coordinate signal according to a touch operation of the user; and
 a touch controller chip configured to analyze the touch coordinate signal and generate the first coordinate data.

11. A control method for achieving synchronized interaction between a display device and a terminal device, wherein the display device comprises a receiving module, a first decoder, a display module, a touch module, a touch point coordinate extracting module, a microcontroller, an encoder and a transmitting module, and the control method includes:
 receiving an image frame from a terminal device by the receiving module;
 extracting image data from the image frame and decoding the extracted image data to obtain decoded image data by the decoder;
 performing an outputting and displaying process on the decoded image data by the display module;
 generating a first coordinate data to achieve a touch and display function by the touch module, in response to an image display command corresponding to a touch point of a user on a touch screen;
 reading the first coordinate data of the touch point of the user on the touch screen by the touch point coordinate extracting module;
 converting the first coordinate data into a second coordinate data according to a correspondence between a resolution of the display device and a resolution of the terminal device by the microcontroller;
 generating a control frame including the second coordinate data by the encoder; and
 transmitting the control frame to the terminal device by the transmitting module;
 wherein the control frame includes a communication protocol identifier for identifying a communication protocol, a terminal device identifier ID and a data segment storing the second coordinate data.

12. The control method of claim 11, wherein the receiving module receives the image frame from the terminal device in a wireless manner, and the transmitting module transmits the control frame to the terminal device in a wireless manner.

13. The control method of claim 12, wherein the display device further includes: a connecting port, a selector, a serial port hub, and a second decoder, and the method further includes:
 receiving the image frame from the terminal device in a wired manner by the connecting port;
 transmitting the decoded image data from the first decoder to the display module or transmitting the image frame received from the connecting port to the serial port hub according to the control of the microcontroller by the selector;
 forwarding the image frame received from the connecting port to the second decoder and forwarding the touch control data to the touch module by the serial port hub; and
 decoding the image frame received from the connecting port by the second decoder to obtain decoded image data and transmitting the decoded image data to the display module.

14. The control method of claim 11, wherein the first coordinate data and the second coordinate data satisfy the following equation:

$$f_2(x_2, y_2) = \frac{TN2}{TN1} \times \frac{F1}{F2} \times N \times f_1(x_1, y_1)$$

wherein $f_1(x_1, y_1)$ represents the first coordinate data; $f_2(x_2, y_2)$ represents the second coordinate data; TN1 represents a total number of touch points in the display device; TN2 represents a total number of touch points in the terminal device; F1 represents a resolution of a screen of the display device; F2 represents a resolution of a screen of the terminal device; N represents a resolution zooming conversion coefficient.

15. The control method of claim 14, wherein when the terminal device is rotated, the terminal device further converts the second coordinate data $f_2(x_2, y_2)$ into a third coordinate data $f_2'(x_2', y_2')$, and variation of the coordinate of the touch point on the terminal device satisfies the following equation:

$$f_2'(x_2', y_2') = \frac{TN2}{TN3} \times \frac{F4}{F3} \times N' \times r \times f_2(x_2, y_2)$$

wherein TN3 represents a total number of touch points along a vertical direction of the terminal device, F3 represents an effective display resolution when the terminal device is oriented vertically, F4 represents an effective display resolution when the terminal device is oriented horizontally; N' represents an effective display resolution zooming conversion coefficient when the terminal device is rotated, the conversion coefficient varies when the Aspect Ratio and the resolution of the screen vary, r represents a screen rotation coefficient.

* * * * *